US012000974B2

(12) United States Patent
Bloomfield et al.

(10) Patent No.: US 12,000,974 B2
(45) Date of Patent: Jun. 4, 2024

(54) MOBILE PLANT FOR LOWERING A TOOL INTO A HOLE

(71) Applicant: Kinetic Logging Services Pty Ltd, Kewdale (AU)

(72) Inventors: Peter John Bloomfield, Kewdale (AU); Pierre Pouchol, Kewdale (AU); Brenton Armitage, Kewdale (AU)

(73) Assignee: KINETIC LOGGING SERVICES PTY LTD, Kewdale (AU)

( * ) Notice: Subject to any disclaimer, the term of this patent is extended or adjusted under 35 U.S.C. 154(b) by 463 days.

(21) Appl. No.: 17/250,946

(22) PCT Filed: Oct. 16, 2019

(86) PCT No.: PCT/AU2019/051126
§ 371 (c)(1),
(2) Date: Apr. 1, 2021

(87) PCT Pub. No.: WO2020/077405
PCT Pub. Date: Apr. 23, 2020

(65) Prior Publication Data
US 2021/0318463 A1    Oct. 14, 2021

(30) Foreign Application Priority Data

Oct. 16, 2018  (AU) ............................... 2018903919

(51) Int. Cl.
*G01V 11/00*        (2006.01)
*B25J 13/08*        (2006.01)
(Continued)

(52) U.S. Cl.
CPC ............. *G01V 11/002* (2013.01); *B25J 13/08* (2013.01); *B25J 15/0019* (2013.01);
(Continued)

(58) Field of Classification Search
None
See application file for complete search history.

(56) References Cited

U.S. PATENT DOCUMENTS 8,739,354 B2 *  6/2014  Buckner ................. E02F 3/384
                                                15/340.1
8,893,830 B2 * 11/2014  Ruth ....................... B60M 7/00
                                                180/2.1
(Continued)

FOREIGN PATENT DOCUMENTS

AU    2014204512 A1    2/2015
WO    2012068629 A1    5/2012
(Continued)

OTHER PUBLICATIONS

Australian Patent Office, PCT International Search Report and Written Opinion dated Nov. 25, 2019 issued in PCT International Application No. PCT/AU2019/051126 filed Oct. 16, 2019.

*Primary Examiner* — Brandi N Hopkins
*Assistant Examiner* — Nigel H Plumb
(74) *Attorney, Agent, or Firm* — Gottlieb, Rackman & Reisman, PC (57) ABSTRACT

A mobile plant for orienting a tool with respect to a hole is provided. The plant includes an arm assembly for supporting a tool wherein the tool is adapted to be lowered into the hole. The plant also includes a primary sensor for sensing the geographical location of the tool, and a secondary sensor for sensing the location and/or orientation of the hole. In use, the plant adjusts the position of the tool supported by the arm assembly based on the geographical location sensed by the primary sensor and the location and/or orientation sensed by the secondary sensor, in order to align the tool supported by the arm assembly with the hole.

18 Claims, 3 Drawing Sheets

(51) Int. Cl.
*B25J 15/00* (2006.01)
*E21B 49/00* (2006.01)
*G05B 19/402* (2006.01)
*G01S 17/89* (2020.01)
*G01S 19/42* (2010.01)

(52) U.S. Cl.
CPC ............ *E21B 49/00* (2013.01); *G05B 19/402* (2013.01); *G01S 17/89* (2013.01); *G01S 19/42* (2013.01); *G05B 2219/37571* (2013.01); *G05B 2219/39397* (2013.01); *G05B 2219/39417* (2013.01)

(56) References Cited

U.S. PATENT DOCUMENTS

| | | | | |
|---|---|---|---|---|
| 2003/0173130 A1* | 9/2003 | Johns | ............ | B25J 5/007 180/234 |
| 2013/0261873 A1* | 10/2013 | Pal | ............ | G01V 3/38 701/28 |
| 2013/0327159 A1* | 12/2013 | Russell | ............ | G01N 1/08 73/863.01 |
| 2015/0204149 A1* | 7/2015 | O'Reilly | ............ | E21B 19/24 175/45 |
| 2018/0231675 A1* | 8/2018 | Degner | ............ | G01V 1/168 |

FOREIGN PATENT DOCUMENTS

| | | | | |
|---|---|---|---|---|
| WO | WO-2012068629 A1 * | 5/2012 | ............ | E21B 47/00 |
| WO | 2014005187 A1 | 1/2014 | | |
| WO | 2017027925 A1 | 2/2017 | | |
| WO | 2017066738 A1 | 4/2017 | | |

* cited by examiner

MOBILE PLANT FOR LOWERING A TOOL INTO A HOLE

CROSS-REFERENCE TO RELATED APPLICATIONS

This application is a national stage filing under 35 U.S.C. § 371 of international application No. PCT/AU2019/051126, filed Oct. 16, 2019, which claims priority to Australian patent application No. 2018903919, filed Oct. 16, 2018. The contents of these applications are incorporated herein by reference in their entirety.

TECHNICAL FIELD

The present invention generally relates to a plant for conducting operations in relation to a hole. In particular these include assessing a hole, in particular for determining certain geological and geotechnical characteristics within the location of the hole, orientating a tool with respect to a hole, and/or plugging the hole.

BACKGROUND ART

In mining operations, particularly open cut mining, the ground to be mined undergoes a blast event to allow for the mining of the ore. Mining operations progressively follow an ore body using drilling and blasting, followed by removing the blasted material and processing the material based on the grade of the ore.

As part of the blasting event a drill rig is used to drill a network of blast holes in a bench before the holes are filled with explosive and detonated. The network of blast holes is specifically designed to ensure the desired blast effect is achieved.

It is of great benefit to the mine in terms of efficiency and processing to obtain an accurate understanding as possible of the grade of ore within the bench. In this regard various measures are taken to identify the grade of the ore before and after the blast holes are drilled. This information can be used to ensure the ore is appropriately processed once mined. A common way to assess the grade/concentration of ore is to analyse the cuttings formed when drilling the blast hole.

When drilling a blast hole the cuttings are deposited around the opening of the blast hole to provide a blast hole cone. Samples are taken from these cuttings and are analysed to identify the grade/concentration of ore in the location of that particular blast hole. When this is conducted over a number of blast holes there is more certainty in relation to the expected grade/concentration of ore. A disadvantage of this sampling method is that the cuttings are mixed during the drilling process. It is therefore difficult to accurately establish the grade of ore. While there are mobile plants which can take the samples and therefore reduce the need of operators to take the actual samples, the samples are still required to be sent for processing. This can take several days to process the samples and return the results to the mine for evaluation.

Another technique used to assess the grade/concentration of ore is to lower a tool, such as a spectrometer or similar tool, into each blast hole whereupon the spectrometer assesses the blast hole to determine the grade/concentration of ore along the length of the hole. The spectrometer is lowered into a blast hole from a mobile plant fitted with a boom/crane. Once one blast hole has been measured the spectrometer is stowed and the mobile plant moves to the next blast hole. While using a spectrometer provides accurate results, the operation to gather the data requires significant human resources. Furthermore, the process of setting up the mobile plant, setting the tool, aligning the tool with each blast hole and measuring the hole can be particularly time consuming. This is particularly the case when the tool does not properly align with the hole and the plant needs to be moved to enable alignment, and/or the boom needs to be adjusted by an operator. This generally requires packing and stowing the tool before the plant can be moved and realigned. Alignment is particularly problematic when the surface adjacent the bore hole is sloped.

The preceding discussion of the background art is intended to facilitate an understanding of the present invention only. The discussion is not an acknowledgement or admission that any of the material referred to is or was part of the common general knowledge as at the priority date of the application.

SUMMARY OF INVENTION

It is an object of this invention to provide a plant and/or a system for orientating a tool relative to a hole and/or assessing desired characteristics of the hole in the ground and/or filling that hole wherein the invention ameliorates, mitigates or overcomes, at least one disadvantage of the prior art, or which will at least provide the public with a practical choice.

In a first aspect, the present invention provides a mobile plant for orienting a tool with respect to a hole, the plant comprising:
  an arm assembly for supporting a tool, the tool being adapted to be lowered into the hole;
  a primary sensor for sensing the geographical location of the tool;
  a secondary sensor for sensing the location and/or orientation of the hole;
  wherein the plant is adapted to adjust the position of the tool supported by the arm assembly based on the geographical location sensed by the primary sensor and/or the location and/or orientation sensed by the secondary sensor to thereby align the tool supported by the arm assembly with the hole.

In a second aspect, the present invention provides a plant for use in relation to various operations associated with a hole, the plant comprising:
  an arm assembly for supporting a tool, the tool being adapted to be lowered into the hole;
  a primary alignment means (or primary aligner) for positioning the plant relative to the hole;
  a secondary alignment means (or secondary aligner) for positioning the tool with respect to a hole, the secondary alignment means (or secondary aligner) ensures the tool is aligned with the hole.

In one embodiment of the second aspect, whereupon alignment with the hole the arm assembly lowers the tool into the hole. In another embodiment, the plant aligns the tool with the hole above the hole.

The operations may include one or more of the following: assessing the hole with the appropriate tool to forecast the grade/concentration of ore around the hole; orienting the tool with respect to the hole; filling the hole, such as with a plug or explosive charge.

The plant of the present invention may be used in relation to any hole, regardless of the purpose of the hole, or how the hole was formed. One such hole is a blast hole. A blast hole is typically a hole that has been drilled with the view of placing explosives therein for subsequent detonation. Typically once the explosives have been placed in the hole, or as part of the process, a plug is positioned in the hole to seal the hole to ensure maximum effect of the explosive.

In a third aspect, the present invention provides a plant for assessing a hole, such as a blast hole, to forecast the grade/concentration of ore around the blast hole, the plant comprising:
- an arm assembly for supporting a tool, the tool being adapted to be lowered into the hole;
- a primary alignment means (or primary aligner) for positioning the plant relative to the hole;
- a secondary alignment means (or secondary aligner) for positioning the tool with respect to a hole, the secondary alignment means (or secondary aligner) ensures the tool is aligned with the hole.

In one embodiment of the third aspect, whereupon alignment with the hole the arm assembly lowers the tool into the hole. In another embodiment, the plant aligns the tool with the hole above the hole.

In a fourth aspect, the present invention provides a plant for assessing a hole, such as a blast hole, to forecast the grade/concentration of ore around the blast hole, the plant comprising:
- an arm assembly for supporting a tool, the tool being adapted to be lowered into the hole;
- a primary alignment means (or primary aligner) for positioning the arm assembly relative to the hole;
- a secondary alignment means (or secondary aligner) for positioning the tool with respect to a hole, the secondary alignment means (or secondary aligner) ensures the tool is aligned with the hole.

In one embodiment of the fourth aspect, whereupon alignment with the hole the arm assembly lowers the tool into the hole. In another embodiment, the plant aligns the tool with the hole above the hole.

Preferably the plant activates the tool as the tool enters the hole to commence collection of data specific to the hole.

Preferably the primary alignment means positions the plant relative to the hole.

In a fifth aspect, the present invention further provides a plant for orientating a tool with respect to a hole, such as a blast hole, the plant comprising:
- an arm assembly for supporting a tool, the tool being adapted to be lowered into the hole;
- a primary alignment means (or primary aligner) for positioning the plant relative to the hole;
- a secondary alignment means (or secondary aligner) for positioning the tool with respect to a hole, the secondary alignment means (or secondary aligner) ensures the tool is aligned with the hole.

In one embodiment of the fifth aspect, whereupon alignment with the hole the arm assembly lowers the tool into the hole. In another embodiment, the plant aligns the tool with the hole above the hole.

In a sixth aspect, the present invention provides a mobile plant for orienting a tool with respect to a hole, the plant comprising:
- an arm assembly for supporting a tool, the tool being adapted to be lowered into the hole;
- a primary alignment means for positioning the plant and/or the arm assembly relative to the hole;
- a secondary alignment means for positioning the tool with respect to a hole, the secondary alignment means ensures the tool is aligned with the hole.

In one embodiment of the sixth aspect, whereupon alignment with the hole the arm assembly lowers the tool into the hole. In another embodiment, the plant aligns the tool with the hole above the hole.

Features of the first to sixth aspects of the present invention may be as described above and below, where appropriate.

The plant may comprise a control means (or controller) to control positioning of the tool. The control means (or controller) may be provided with a unique hole ID for each hole to be measured.

The primary alignment means may cause the plant to align with the hole.

The primary alignment means may align the plant with each hole based on each hole ID. The hole ID may be used by the control means to log the data specific for that hole. Upon alignment of the plant with the hole using the primary alignment means, the secondary alignment means detects the position of the hole and determines the orientation of the plant with respect to the hole. The secondary alignment means may adjust the arm assembly such that the tool supported by the arm assembly is caused to align with the hole opening. The secondary alignment means may cause the tool to be placed at a desired angle to the vertical. In one variation the secondary alignment means may cause the tool to be placed in a vertical orientation.

The primary alignment means may comprise a primary sensor. The primary alignment means may incorporate GPS for aligning the plant with respect to the hole. In one aspect of the invention alignment of the plant using the primary alignment means may be by a remote operator. In another aspect of the invention alignment of the plant using the primary alignment means may be autonomous. In one embodiment, the primary alignment means may cause the plant to the positioned relative to the hole. The primary alignment means may be provided with GPS locations of each hole to be measured.

The primary sensor may be a geographical location sensor. The geographical location sensor may be, for example, a sensor for a satellite positioning system (such as GPS or GLONASS). In another embodiment, the primary sensor may sense the location of the tool relative to one or more fixed points, for example by radar or with reference to a beacon.

In one embodiment, the primary sensor (or primary alignment means) may assist an operator to align the plant relative to the hole. For example, the plant may be located on a vehicle, and the primary sensor (or primary alignment means) may include a geographical location sensor to assist the driver of the vehicle to position the plant relative to the desired hole. In another embodiment, the controller may be adapted to position a vehicle including the plant relative to the hole based on the geographical location sensed by the primary sensor. In this embodiment, the vehicle may be a driverless (or autonomous) vehicle. In one embodiment, the plant is adapted to be positioned based on the geographical location sensed by the primary sensor.

In another embodiment, the arm assembly may also be positioned based on the geographical location sensed by the primary sensor. In one embodiment, the plant may be adapted to position the tool in proximity to (or over) the hole based on the geographical location sensed by the primary sensor.

In one embodiment, the plant (or the primary alignment means) may include more than one primary sensor. The plant (or the primary alignment means) may include two, three, four or five primary sensors, especially two primary sensors. The primary sensors may be positioned along the arm assembly (especially along at least one boom arm). The primary sensors may mark the geographical location at each primary sensor along the at least one boom arm. This may provide the location of the tool relative to the remainder of the plant. Using multiple primary sensors may also improve the accuracy of the geographical location position.

The secondary alignment means may comprise at least one secondary sensor for sensing the alignment of the tool with respect to the hole. The secondary sensor and/or the secondary alignment means may comprise one or more of the following: laser scanner, camera (to allow, for example, image recognition or image processing), and lidar (especially solid state lidar).

The secondary sensor may sense the location and/or the orientation of the hole. The position or alignment of the tool supported by the arm assembly may be positioned and/or aligned relative to the hole based on the location and/or orientation sensed by the secondary sensor. In one embodiment, the plant may be adapted to align the tool with the hole based on the geographical location sensed by the secondary sensor. The secondary sensor may detect the height of the tool relative to the hole.

In one embodiment, the plant (or the secondary alignment means) may include more than one secondary sensor. However, in one embodiment, the plant (or the secondary alignment means) includes only one sensor. The secondary sensor may be positioned on the arm assembly, especially proximate to the tool. In one embodiment, the controller may be adapted to align the tool relative to the hole based on the hole location and/or orientation sensed by the secondary sensor.

The controller may be adapted to adjust the position of the tool supported by the arm assembly based on the geographical location sensed by the primary sensor and/or the location and/or orientation sensed by the secondary sensor to thereby align the tool supported by the arm assembly with the hole. The controller may receive input from the primary sensor and/or the secondary sensor. The controller may receive input from a data source (or data store) which provides hole data (for example from when the holes were drilled). In one embodiment, the controller includes a data store which includes geographical location data for a plurality of holes, and said controller compares the geographical location sensed by the primary sensor with geographical location data in the data store for at least one said hole. The data store or hole data may include the geographical position, depth and/or orientation of a said (or each) hole. The controller may calculate the position and/or orientation (or alignment) of the tool relative to the hole and adjust the position of the tool accordingly (for example by extending or retracting the first boom arm portion, or by adjusting or rotating the slew assembly, as discussed below). The controller may calculate the position of the tool relative to the hole and adjust the position of the plant and/or the arm assembly accordingly. The controller may include, for example, a computer system. The controller may operate autonomously.

In one embodiment, the controller or the plant is adapted to adjust the arm assembly (or a portion thereof) to thereby adjust the position of the tool supported by the arm assembly.

The controller may control the length of cable connected to the tool or the winch.

The controller may control the activation of the tool. The controller may collect and/or store data from the tool. The controller may analyse data from the tool. The controller may include processing means (or a processor), for example to process a point cloud image to provide an image of the hole and the position of the hole relative to the secondary sensor. The processing means may be adapted to remove certain data from the cloud point image, for example, the cuttings adjacent the hole.

The controller may be adapted to engage the boom arm (or second boom arm portion) with a tool stored in a storage container. The controller may be adapted to open and/or close the tool container. The controller may be adapted to connect the tool and the cable. The controller may pretension the cable.

The controller may adjust (such as retract and extend) the stablisers (as discussed further below).

The arm assembly may position the tool with 3, 4, 5, or 6 degrees of freedom, especially 6 degrees of freedom.

The arm assembly may comprise a cable which has one end adapted to be secured to an end of the tool. The arm assembly may also comprise a winch upon which the cable is wound, the winch causing the tool to be lowered and raised. The cable may transmit data to and from the tool. This data may include data to control the function of the tool, data relevant to the position/depth of tool, data relevant to the health of the tool. The cable may be associated with a plurality of strain gauges to determine tension.

The arm assembly may comprise a boom arm for supporting and aligning the tool. The boom arm may be articulated at one or more locations.

The arm assembly may comprise a cable tensioning means to maintain the tension of the cable within a predetermined range. The cable tensioning means may control the winch such that the cable is wound on or off the winch to accommodate movement of the boom arm.

The cable may pass through a plurality of guide means (or guides) to support the cable in close proximity to the boom arm. Preferably the movement of the boom arm is relative to the longitudinal axis of the cable. In this regard the boom arm rotates/rolls relative to the centre line of the cable, rather than the cable moving relative to the longitudinal axis of the boom arm. As the boom arm moves relative to the longitudinal axis of the cable, the integrity of the cable is not compromised, protecting the data which is transmitted along the cable.

The guide means may be in the form of a plurality of pulleys, sheaves, worm drives and/or slew rings.

The boom arm may incorporate a slew assembly. The cable may pass through the slew assembly.

The slew assembly may compensate for changes in the orientation of the boom arm particularly when the boom arm extends outwardly from the plant (e.g. change in orientation due to droop of the boom arm).

The boom arm may comprise position identification means for determining/verifying the position of the boom arm. The position identification means may be in the form of a plurality of GPS locators attached to the boom arm. The position identification means may include at least one primary sensor (which may be attached to the boom arm), especially the first boom arm portion (as discussed below). The position identification means may be in the form of a plurality of inclinometers attached to the boom arm (especially the first boom arm portion). In one embodiment, the primary sensor is mounted to the first boom arm portion. In another embodiment, the secondary sensor is mounted to the slew assembly.

The boom arm may be secured to the back of the plant such that it may rotate about a vertical axis so as to be positioned either side of the plant. The boom arm may be capable of extending outwardly away from the plant. With this configuration the boom arm is able to reach more than one hole without moving the plant. By way of example, the boom arm may be configured to position the tool within a 15 m radius from where the boom arm is mounted on the plant. The boom arm may be adapted to maintain the end of the tool at a selected distance from the ground when the plant is moved to the next hole. By way of example, the selected distance may be 0.5 m.

The plant may provide a tool storage compartment for storing one or more tools. The tool storage compartment may be controlled to be maintained within a certain temperature range. As a result the tools can be stored at their optimum operational temperature.

The plant may provide a power supply for providing power to the plant (including the tool).

The plant may provide stabilisers to support the plant in a stable condition during operation of the plant.

The plant may be located on a truck or other mobile vehicle. The plant may be a mobile plant. The stabilisers may be located at the rear of the vehicle. The stabilisers may be at least two stabilisers at the rear of the vehicle. The stabilisers may be retractable legs located at the rear of the vehicle.

By way of example, the plant may be capable of one cycle every eight minutes wherein a cycle is considered to be the time it takes for the tool to move from a position relative to a first hole to the same position relative to an adjacent second hole, wherein the tool has collected data associated with one of the holes. In such a scenario the depth of the hole may be 8 m, for example.

The plant may incorporate a plurality of sensors to detect certain parameters before the plant is able to operate. The sensors may detect the position of the operators and/or the condition of the plant to ensure the operators are in a safe position before the plant is able to operate. Different operational sequences may require different parameters to be meet before an operational sequence may commence.

The boom arm assembly may comprise a first boom arm portion and a second boom arm portion. The first and second boom arm portions may be interconnected by a slew assembly. The slew assembly may enable movement of the first boom arm portion relative to the second boom arm portion about a plurality of axes. The tool may be releasably engageable with the second boom arm portion. The tool may be clamped in position by the second boom arm portion. The second boom arm portion may include grippers for gripping the tool. The first boom arm portion may be extendable, especially telescopic. The first boom arm portion may be connected to a mast portion. The mast portion may, for example, be mounted to a vehicle.

The boom arm assembly may include a guide for guiding the tool into the hole. This may be advantageous if the hole angled off vertical or if the plant is being used in high wind, for example. The guide may be in contact when the tool when the tool is engaged by the second boom arm portion. The guide may be or include, for example, a ring the tool slides through.

In a seventh aspect, the present invention further provides a boom arm assembly adapted to support and guide a cable therealong, the boom arm assembly comprises a first boom arm portion and a second boom arm portion wherein the first boom arm portion and second boom arm portion are interconnected by a slew assembly, wherein the slew assembly enables movement of the first boom arm portion relative to the second boom arm portion about a plurality of axes. The slew assembly may enable movement of the first boom arm portion relative to the second boom arm portion about three axes. Features of the seventh aspect of the present invention may be as described above and below.

The slew assembly may comprise a plurality of pulleys and slew rings. Preferably the slew assembly rotates relative to the cable such that the cable is able to travel therethrough irrelevant of the orientation of the boom arm assembly.

The tool may be for, for example, assessing the grade/concentration of ore around or in the hole; filling the hole, such as with a plug; or positioning an explosive charge. In one embodiment, the tool is for assessing the grade/concentration of ore around or in the hole. The tool may perform elemental spectroscopy (or is an elemental spectrometer) within the hole (the controller or processing means may be able to calculate the estimated minerology in the hole based on this data). When the tool performs elemental spectroscopy (or is an elemental spectrometer) the neutron generator for the spectrometer may have time to full power up as the tool descends into the hole. The tool may measure the density of the rock surrounding the hole, for example.

In an eighth aspect, the present invention may provide a method for placing equipment or a tool in a hole, such as a blast hole, the method may comprise:
  executing a first operational sequence wherein a plant is positioned relative to the hole and placed into a ready position for accessing the hole;
  executing a second operation sequence wherein the plant is placed into a ready position for guiding the equipment into the hole;
  executing a third operation sequence wherein the plant lowers the equipment into the hole.

In a ninth aspect, the present invention provides a method of collecting data from an array of holes wherein the data is representative of the geological composition of the hole, the method may comprise:
  executing a first operational sequence wherein a plant is positioned relative to the hole and placed into a ready position for receiving a tool which is adapted to collect the data;
  executing a second operation sequence wherein the plant is placed into a ready position for collecting the data;
  executing a third operation sequence wherein the plant collects the data associated with the hole; and
  executing a fourth operation sequence wherein the plant is placed into a mobile condition and moved to an adjacent hole.

The first operational sequence may comprise positioning the plant in proximity to the hole using a primary alignment means or a primary sensor. The primary alignment means or primary sensor may use GPS or a geographical location sensor.

The first operational sequence may comprise lowering stabilising means (or stabilisers) to stabilise the plant. This may be automated.

The first operational sequence may comprise opening the lid of a tool container (or box) and selecting a tool therefrom. This may be automated.

The second operational sequence may comprise closing the lid of the tool container (or tool box). This may be automated.

The second operational sequence may comprise returning or positioning the plant in an operational mode after the operator receives a signal that the tool is connected to a data collector. This may be automated.

The second operational sequence may comprise placing the plant in a standby mode before attaching a cable head of the boom arm assembly to the cable and pre-tensioning the cable. In an alternative variation the sequence of attaching a cable head of the boom arm assembly to the cable and pre-tensioning the cable is conducted automatically without requiring an operator to manually attach the cable head and pretension the cable.

The second operational sequence may comprise using a secondary alignment means or secondary sensor in the form of a laser scanner to scan the hole to provide a point cloud image of the hole and its surrounds. A processing means may process the point cloud image to provide an image of the hole and the position of the hole relative to the laser scanner. The controller may include said processing means. The processing means may remove certain data from the point cloud image, such as the cuttings adjacent the hole. The tool may be rotated before scanning the hole to provide a clear field of view for the scanner. This may be automated.

The second operational sequence may comprise adjusting the position of the boom arm using the results of the laser scan to align the tool with the hole. The laser scanner may provide the position of the hole relative to the plant. This may be automated.

The third operational sequence may comprise lowering the tool to the bottom of the hole. The depth counter of the tool may be reset when the tool is at ground level. The depth of the hole may be read from an input file which at least provides GPS or geographical location data associated with the hole as well as the hole's depth. The input file may be generated from information gathered from/during the drilling process. This may be automated.

The third operational sequence may comprise raising the tool and collecting data at predetermined intervals as the tool travels towards the surface. The intervals may be every 5 cm, 10 cm, 20 cm, 25 cm or 30 cm, for example. This may be automated.

The fourth operational sequence may comprise raising the tool a predetermined distance above the ground, retracting the boom arm to be in proximity to the plant, and moving the plant to the next hole to be measured. This may be automated.

In a tenth aspect, the present invention provides a mobile plant for orienting a tool with respect to a hole, the plant comprising:
an arm assembly for supporting a tool, the tool being adapted to be lowered into the hole;
a primary sensor for sensing the geographical location of the tool;
a controller for adjusting the position of the tool supported by the arm assembly based on the geographical location sensed by the primary sensor, and hole data which comprises the geographical location and/or orientation of the hole, to thereby align the tool supported by the arm assembly with the hole.

Features of the tenth aspect of the invention may be as described above. The hole data may be derived or obtained from when the holes were drilled.

In a eleventh aspect, the present invention provides a method of assessing the grade/concentration of ore in a hole, the method comprising:
positioning the plant of any one of the first to sixth or tenth aspects of the invention relative to a hole;
sensing the geographical location of the tool relative to the hole, and sensing the alignment of the tool with respect to the hole, and adjusting the position of the tool based on the sensed geographical location and the sensed alignment, to thereby align the tool with the hole; and lowering the tool into the hole.

In an twelfth aspect, the present invention provides a method of assessing the grade/concentration of ore in a hole, the method comprising:
positioning the plant of the tenth aspect of the invention relative to a hole;
sensing the geographical location of the tool relative to the hole, and adjusting the position of the tool based on the sensed geographical location and compared to the stored hole data which comprises the geographical location and/or orientation of the hole, to thereby align the tool with the hole; and
lowering the tool into the hole.

Features of the eleventh and twelfth aspects of the invention may be as described above.

Any of the features described herein can be combined in any combination with any one or more of the other features described herein within the scope of the invention.

In various embodiments, statements of the invention may be as defined in one or more of the following paragraphs:

1. A plant for assessing a hole, such as a blast hole, to forecast the grade/concentration of ore around the blast hole, the plant comprising:
an arm assembly for supporting a tool, the tool being adapted to be lowered into the hole;
a primary alignment means for positioning the arm assembly relative to the hole;
a secondary alignment means for positioning the tool with respect to a hole, the secondary alignment means ensures the tool is aligned with the hole;
whereupon alignment with the hole the arm assembly lowers the tool into the hole.

2. The plant according to paragraph 1 wherein the primary alignment means positions the plant relative to the hole.

3. A plant for orientating a tool with respect to a hole, such as a blast hole, the plant comprising:
an arm assembly for supporting a tool, the tool being adapted to be lowered into the hole;
a primary alignment means for positioning the plant relative to the hole; aligning vehicle can be independent
a secondary alignment means for positioning the tool with respect to a hole, the secondary alignment means ensures the tool is aligned with the hole;
whereupon alignment with the hole the arm assembly lowers the tool into the hole, the plant.

4. The plant according to any one of the preceding paragraphs further comprising a control means to control positioning of the tool, the control means being provided with a unique hole ID for each hole to be measured.

5. The plant according to any one of the preceding paragraphs wherein the primary alignment means causes the plant to align with the hole.

6. The plant according to paragraph 5 wherein the primary alignment means incorporates GPS for aligning the plant with respect to the hole.

7. The plant according to any one of the preceding paragraphs wherein the secondary alignment means comprises one or more of the following: laser scanner, camera, solid state lidar, wherein the secondary alignment means detects the position of the hole and determines the orientation of the plant with respect to the hole.

8. The plant according to paragraph 7 wherein the secondary alignment means adjusts the arm assembly such that the tool supported by the arm assembly is caused to align with the hole opening.

9. The plant according to paragraph 7 or 8 wherein the secondary alignment means causes the tool to be placed at a desired angle to the vertical.

10. The plant according to paragraph 7 or 8 wherein the secondary alignment means may cause the tool to be placed in a vertical orientation.

11. The plant according to any one of the preceding paragraphs wherein the arm assembly comprises a cable which has one end adapted to be secured to an end of the tool.

12. The plant according to any one of the preceding paragraphs wherein the arm assembly also comprises a winch upon which the cable is wound, the winch causing the tool to be lowered and raised.

13. The plant according to paragraph 11 wherein the cable transmits data to and from the tool.

14. The plant according to paragraph 13 wherein the cable is associated with a plurality of strain gauges to determine tension.

15. The plant according to any one of the preceding paragraphs wherein the arm assembly comprises a boom arm for supporting and aligning the tool, the boom arm is articulated at one or more locations.

16. The plant according to any one of the preceding paragraphs wherein the arm assembly comprises a cable tensioning means to maintain the tension of the cable within a predetermined range.

17. The plant according to paragraph 16 when dependent on paragraph 12 wherein the cable tensioning means controls the winch such that the cable is wound on or off the winch to accommodate movement of the boom arm.

18. The plant according to any one of paragraphs 11 to 17 wherein the cable passes through a plurality of guide means to support the cable in close proximity to the boom arm.

19. The plant according to paragraph 18 wherein the movement of the boom arm is relative to the longitudinal axis of the cable.

20. The plant according to any one of paragraphs 11 to 19 wherein the boom arm incorporates a slew assembly such that the cable passes through the slew assembly.

21. The plant according to paragraph 20 wherein the slew assembly compensates for changes in the orientation of the boom arm particularly when the boom arm extends outwardly from the plant.

22. The plant according to any one of paragraphs 15 to 21 wherein the boom arm comprises position identification means for determining/verifying the position of the boom arm.

23. The plant according to paragraph 22 wherein the position identification means is in the form of a plurality of GPS locators attached to the boom arm and/or a plurality of inclinometers attached to the boom arm.

24. The plant according to any one of paragraphs 15 to 23 wherein the boom arm is secured to the back of the plant such that it rotates about a vertical axis so as to be positioned either side of the plant.

25. The plant according to any one of paragraphs 15 to 24 wherein the boom arm is capable of extending outwardly away from the plant.

26. The plant according to any one of paragraphs 15 to 25 wherein the boom arm is adapted to maintain the end of the tool at a selected distance from the ground while the plant is moved to the next hole.

27. The plant according to any one of the preceding paragraphs comprising a tool storage compartment for storing one or more tools, the tool storage compartment being controlled to be maintained within a certain temperature range.

28. The plant according to any one of the preceding paragraphs comprising a power supply for providing power to the plant.

29. The plant according to any one of the preceding paragraphs comprising stabilisers to support the plant in a stable condition during operation of the plant.

30. The plant according to any one of the preceding paragraphs located on a truck or other mobile vehicle.

31. The plant according to any one of the preceding paragraphs comprising a plurality of sensors to detect certain parameters before the plant is able to operate.

32. A plant for use in relation to various operations associated with a hole the plant comprising:
   an arm assembly for supporting a tool, the tool being adapted to be lowered into the hole;
   a primary alignment means for positioning the plant relative to the hole;
   a secondary alignment means for positioning the tool with respect to a hole, the secondary alignment means ensures the tool is aligned with the hole;
   whereupon alignment with the hole the arm assembly lowers the tool into the hole.

33. A plant for assessing a hole, such as a blast hole, to forecast the grade/concentration of ore around the blast hole, the plant comprising:
   an arm assembly for supporting a tool, the tool being adapted to be lowered into the hole;
   a primary alignment means for positioning the plant relative to the hole;
   a secondary alignment means for positioning the tool with respect to a hole, the secondary alignment means ensures the tool is aligned with the hole;
   whereupon alignment with the hole the arm assembly lowers the tool into the hole.

34. A boom arm assembly adapted to support and guide a cable therealong, the boom arm assembly comprises a first boom arm portion and a second boom arm portion wherein the first boom arm portion and second boom arm portion are interconnected by a slew assembly, wherein the slew assembly enables movement of the first boom arm portion relative to the second boom arm portion about a plurality of axes.

35. The boom arm assembly according to paragraph 34 wherein the slew assembly enables movement of the first boom arm portion relative to the second boom arm portion about three axes.

36. The boom arm assembly according to paragraph 34 or 35 wherein the slew assembly comprises a plurality of pulleys and slew rings.

37. The boom arm assembly according to paragraph 34, 35 or 36 wherein the slew assembly rotates relative to the cable such that the cable is able to travel therethrough irrelevant of the orientation of the boom arm assembly.

38. A method of collecting data from an array of holes wherein the data is representative of the geological composition of the hole, the method may comprise:
   executing a first operational sequence wherein a plant is positioned relative to the hole and placed into a ready position for receiving a tool which is adapted to collect the data;
   executing a second operation sequence wherein the plant is placed into a ready position for collecting the data;
   executing a third operation sequence wherein the plant collects the data associated with the hole; and
   executing a fourth operation sequence wherein the plant is placed into a mobile condition and moved to an adjacent hole.

39. The method according to paragraph 38 wherein the first operational sequence comprises positioning the plant in proximity to the hole using a primary alignment means, wherein the primary alignment means uses GPS.

40. The method according to paragraph 38 or 39 wherein the first operational sequence comprises lowering stabilising means to stabilise the plant.

41. The method according to paragraph 38, 39 or 40 wherein the first operational sequence comprises opening the lid of a tool box and selecting a tool therefrom.

42. The method according to any one of paragraphs 38 to 41 wherein the second operational sequence comprises closing the lid of the tool box.

43. The method according to any one of paragraphs 38 to 42 wherein the second operational sequence comprises returning the plant to its operational mode after the operator receives a signal that the tool is connected to a data collector.

44. The method according to any one of paragraphs 38 to 43 wherein the second operational sequence comprises placing the plant in a standby mode before attaching a cable head of the boom arm assembly to the cable and pre-tensioning the cable.

45. The method according to any one of paragraphs 38 to 44 wherein the second operational sequence comprises using a secondary alignment means in the form of a laser scanner to scan the hole to provide a point cloud image of the hole and its surrounds, a processing means may then process the point cloud image to provide an image of the hole and the position of the hole relative to the laser scanner.

46. The method according to any one of paragraphs 38 to 45 wherein the second operational sequence comprises adjusting the position of the boom arm using the results of the laser scan to align the tool with the hole.

47. The method according to any one of paragraphs 38 to 46 wherein the third operational sequence comprises lowering the tool to the bottom of the hole.

48. The method according to any one of paragraphs 38 to 47 wherein the third operational sequence comprises raising the tool and collecting data at predetermined intervals as the tool travels towards the surface.

49. The method according to any one of paragraphs 38 to 48 wherein the fourth operational sequence comprises raising the tool a predetermined distance above the ground, retracting the boom arm to be in proximity to the plant, and moving the plant to the next hole to be measured.

BRIEF DESCRIPTION OF THE DRAWINGS

Further features of the present invention are more fully described in the following description of a non-limiting embodiment thereof. This description is included solely for the purposes of exemplifying the present invention. It should not be understood as a restriction on the broad summary, disclosure or description of the invention as set out above. The description will be made with reference to the accompanying drawings in which.

In the drawings like structures are referred to by like numerals throughout the several views. The drawings shown are not necessarily to scale, with emphasis instead generally being placed upon illustrating the principles of the present invention.

DESCRIPTION OF EMBODIMENTS

Figure 1:
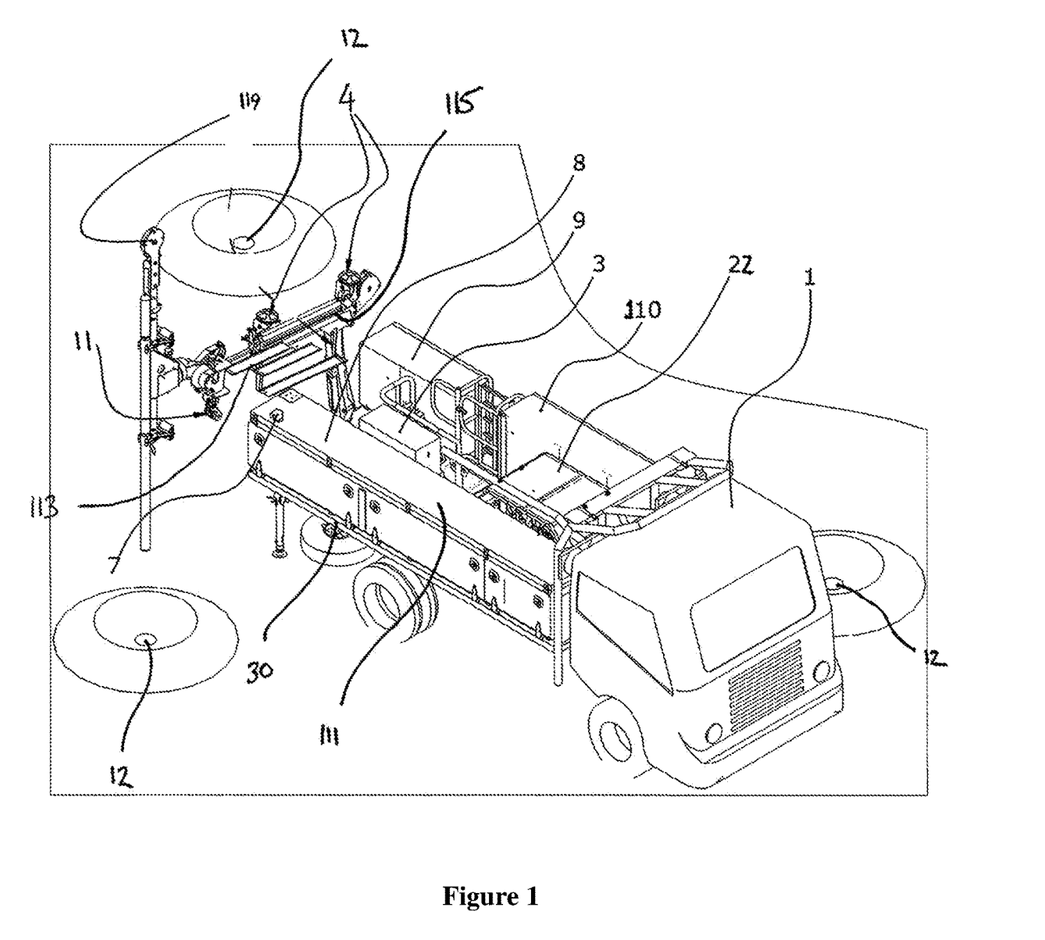
FIG. 1 is a schematic view of a plant according to a first embodiment of the invention wherein the plant is provided on a truck.

The present invention, according to an embodiment, is in the form of a plant 111 comprising a platform 30. In this embodiment the plant is fitted with a particular downhole tool such that the plant is set up to assess a blast hole to determine grade/concentration of the ore around the blast hole. However, there are other downhole tools which may be fitted such that the plant can determine other characteristics and/or other material. For instance, other downhole tools may be used to assess density, porosity, formation or other geotechnical information. Most of these characteristics cannot be determined by an analysis of the cuttings. The plant may also be adapted to fill and plug blast holes.

In this embodiment the platform 30 is provided by a tray of a truck 1. Being positioned on a truck the plant is highly mobile and may be easily transported from location to location. The plant 111 provides a means by which the geology of a hole may be determined quickly and cost effectively. The plant is particularly suited for measuring the geology of blast holes 12.

As part of normal mining operations at open cut mines, a sequence of blasts are used to break up a bench. In preparation of the blasting a network of blast holes 12 are drilled for receiving explosives. Before the blast holes 12 are filled, the plant 111 of the present invention lowers a tool 10 in the blast hole to determine the geology relevant to each blast hole measured. This data can then be used to determine the grade of ore which can be expected in that bench. This information helps the mine determine the required processing of the ore after the blasting operation is complete.

The plant 111 comprises an arm assembly 113 for supporting and moving the tool 10. The arm assembly 113 comprises a boom arm 115 which supports and guides a cable 2 therealong. The arm assembly 113 also comprises a winch 22 for controlling the movement of the cable 2.

The plant 111 provides a tool box 8 for storing the tool 10 at a desired temperature.

The plant 111 is independently powered by its own power supply 9. In other variations power may be supplied to the plant from the vehicle transporting the plant, or from other means which would be readily understood by a person skilled in the art. It may be the case that the plant incorporates a converter to convert any power supply to 240V.

Referring to FIGS. 2 to 6, the boom arm 115 comprises a first boom arm portion 117, adapted to be secured to the plant, and a second boom arm portion 119 adapted to support and guide the tool 10. The first boom arm portion 117 and the second boom arm portion 119 are interconnected by a slew assembly 3.

Figures 2, 3:
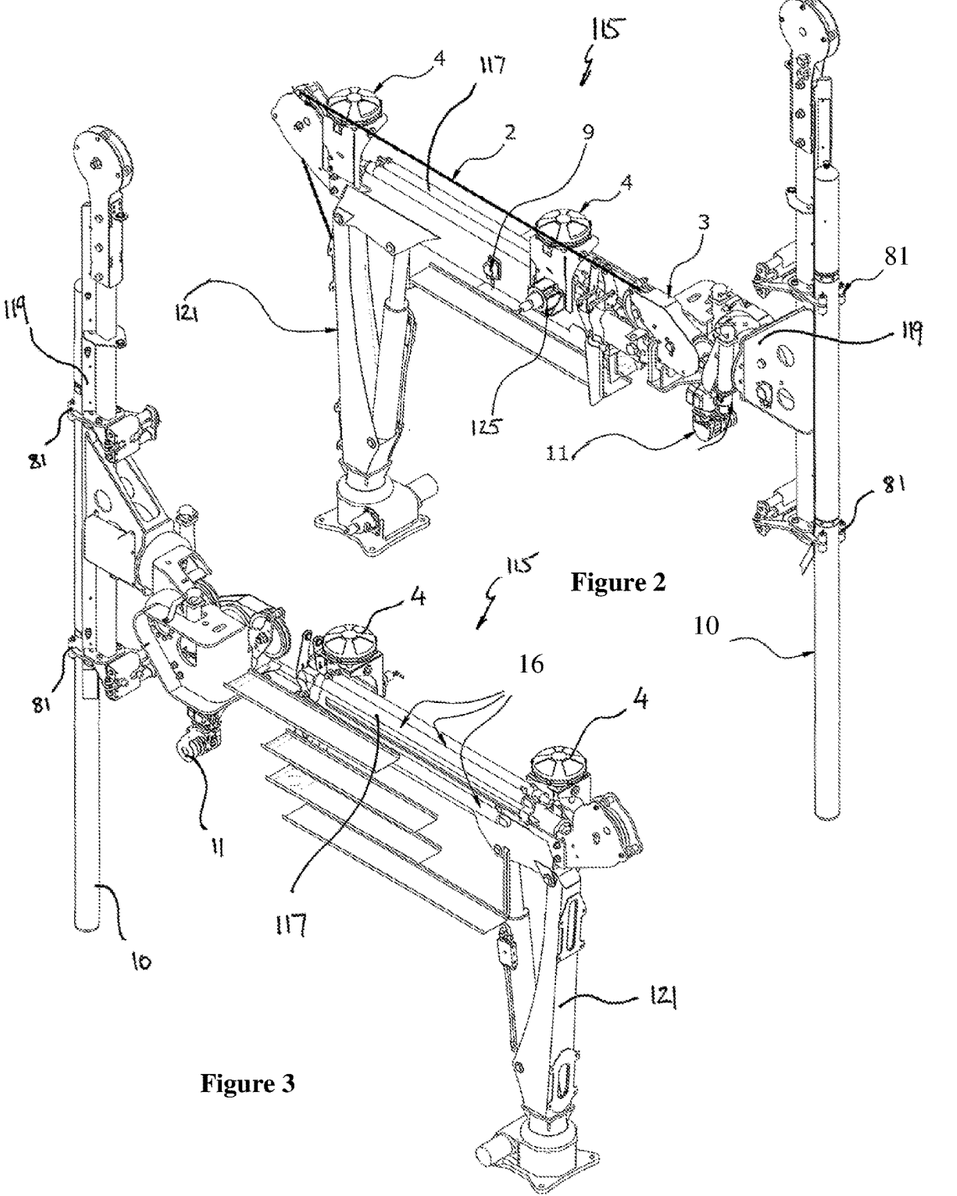
FIG. 2 shows a side perspective view of a boom arm having a cable extend therealong, the boom arm is shown supporting a tool.
FIG. 3 shows an alternate side perspective view of the boom arm in FIG. 2, the boom arm is shown supporting the tool.

The first boom arm portion 117 is pivotally secured to a support mast 121 at an end distal from the slew assembly 3. The support mast 121 extends between the first boom arm 117 and the platform 30 to secure the boom arm 115 to the platform 30. The support mast 121 is rotatably secured to the platform 30 such that the boom arm 115 can be rotated about a vertical axis to be positioned either side of the truck.

The first boom arm portion 117 is telescopic in nature such that it can move between a retracted condition and an extend condition. This allows the tool to be positioned outwardly from the truck. The first boom arm portion 117 has a set of actuators 16 which move the first boom arm portion 117 to the required extension from the truck.

The first boom portion 117 incorporates two GPS locators (primary sensors) 4 fixed relative to each other and a boom sensor 125 positioned such that the control means 110 is able to determine the position of the boom arm 115 and whether the boom arm 115 is in a retracted condition, extended condition or somewhere in between. To assist in determining the position of the first boom portion 117 an inclinometer 91 is secured thereon.

The second boom arm portion 119 is generally in a traverse orientation to the first boom portion 117 and supports the tool 10. Until the tool 10 is in a position to be lowered, a set of tool grippers 81 retain the tool 10 relative to the second boom arm portion 119. To assist in determining the position of the second boom portion 119 an inclinometer 92 is secured thereon.

Figure 4:
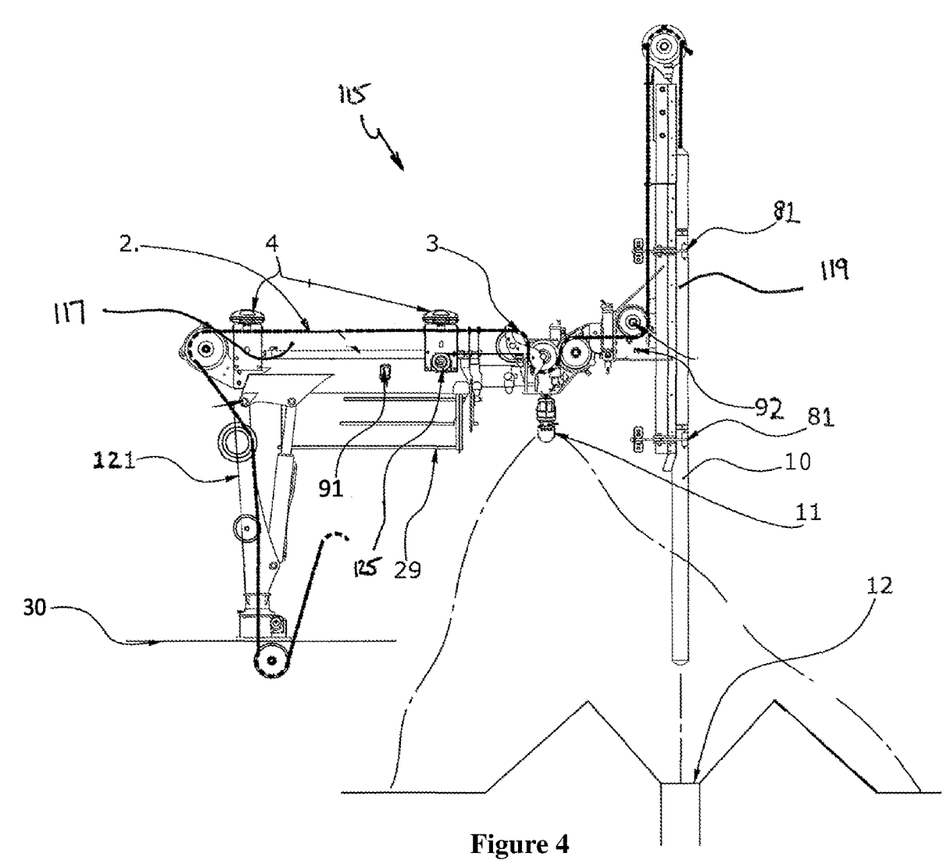
FIG. 4 is a side view of the boom arm shown in FIG. 2 positioned relative to a hole.
Figure 5:
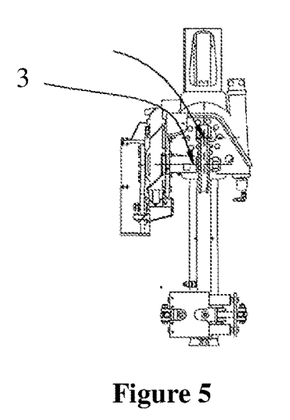
FIG. 5 is a plan view of the boom arm shown in FIG. 2.
Figure 6:
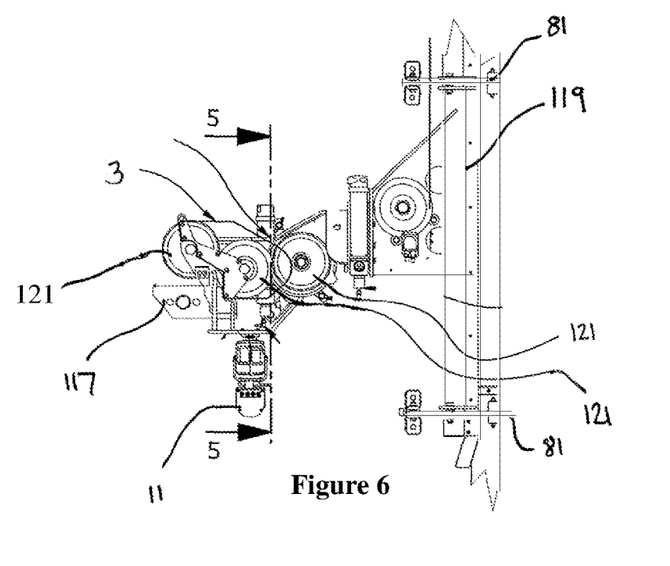
FIG. 6 is a view of a slew assembly of the boom arm shown in FIG. 2.

The slew assembly 3 comprises three pulleys 121, a first slew ring 5 and a second slew ring 6. As best shown in FIG. 4, the cable 2 passes therealong and is supported by each pulley 121. The slew assembly 3 adjusts the position of the second boom arm portion 119 relative to the first boom portion 117 when aligning the tool 10 with the hole 12. In this regard the slew assembly 3 is able to move the second boom arm portion 119 about three axes to ensure correct alignment of the tool 10.

The slew assembly 3 supports a second alignment means (or secondary sensor) in the form of a scanner 11 (or lidar). The scanner 11 provides a point cloud image of the hole. This data is used to adjust the slew assembly 3 so that the tool 10 may be aligned with the hole 12 before the tool is lowered therein. The slew assembly 3 provides the plant with significant maneuverability whereby the tool can be correctly orientated and positioned without having to ensure a certain orientation of the platform.

The plant also provides a control means 110 to control the winch 22 to assist in maintaining the cable 2 at the desired tension.

Once the plant 111 is set up and the tool 10 is supported by the boom arm 115, the first alignment means (or first sensor) is used to guide the truck 1 to a position adjacent the hole 12. Once in position, stabilising means in the form of stabilising supports 123 are lowered to support the plant during operation.

The laser scanner 11 (a secondary sensor) may then be used to scan the hole 12 to provide a point cloud image of the hole 12 and its surrounds. A processing means then processes the point cloud image to provide an image of the hole and the position of the hole relative to the laser scanner 11. Depending on this data the control means may manoeuvre the slew assembly 3 to adjust the position of the boom arm 115 to align the tool 10 with the hole 12.

Once the tool 10 is aligned with the hole the control means may operate the winch to lower the tool 10 to the bottom of the hole. Once at the bottom of the hole the tool may be raised to the surface during which the tool collects data at predetermined intervals.

Once the tool 10 has reached the top of the hole, the boom arm 115 may be retracted to position the tool in close proximity to the plant. The second boom arm portion provides two tool grippers 8.1, 8.2 which are activated to hold the tool 10 in position relative to the second boom arm portion 119. The stabilising supports 123 may then be retracted and the truck located to the next hole.

In operation the plant 111, once set up, is capable of measuring each blast hole 12 in a short period of time in a manner which is more efficient and safer. This provides a vast improvement over prior art methods which requires significant operator involvement and handling of heavy components. The present invention is more accurate and can quickly source the required data from the network of holes.

Modifications and variations such as would be apparent to the skilled addressee are considered to fall within the scope of the present invention. The present invention is not to be limited in scope by any of the specific embodiments described herein. These embodiments are intended for the purpose of exemplification only. Functionally equivalent products, formulations and methods are clearly within the scope of the invention as described herein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprise", "comprises," "comprising," "including," and "having," or variations thereof are inclusive and therefore specify the presence of stated features, integers, steps, operations, elements, and/or components, but do not preclude the presence or addition of one or more other features, integers, steps, operations, elements, components, and/or groups thereof.

The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Such variations are not to be regarded as a departure from the disclosure, and all such modifications are intended to be included within the scope of the disclosure.

The invention claimed is:

1. A mobile plant for orienting a tool with respect to a hole, the plant comprising:
    an arm assembly for supporting a tool, the tool being adapted to be lowered into the hole;
    at least one primary sensor for sensing the geographical location of the tool; and
    at least one secondary sensor for sensing the location and/or orientation of the hole;
    wherein the plant is adapted to adjust the position of the tool supported by the arm assembly based on the geographical location sensed by the at least one primary sensor and the location and/or orientation sensed by the at least one secondary sensor, to thereby align the tool supported by the arm assembly with the hole, wherein the arm assembly positions the tool with at least three degrees of freedom.

2. The mobile plant of claim 1, wherein the at least one primary sensor is a geographical location sensor.

3. The mobile plant of claim 1 wherein the at least one primary sensor is a multiple of primary sensors which are positioned along the arm assembly.

4. The mobile plant of claim 1, wherein the plant is adapted to be positioned based on the geographical location sensed by the at least one primary sensor.

5. The mobile plant claim 1, wherein the at least one secondary sensor comprises one or more of a laser scanner, a camera, and a lidar.

6. The mobile plant of claim 5, wherein the at least one secondary sensor is a solid state lidar.

7. The mobile plant of claim 1, further comprising a controller which receives input from the at least one primary sensor and the at least one secondary sensor, and is adapted to adjust the position of the tool supported by the arm assembly based on the geographical location sensed by the at least one primary sensor and the location and/or orientation sensed by the at least one secondary sensor, to thereby align the tool supported by the arm assembly with the hole.

8. The mobile plant of claim 7, wherein the controller comprises a data store which comprises geographical location data for a plurality of holes, and said controller compares the geographical location sensed by the at least one primary sensor with geographical location data in the data store for at least one said hole.

9. The mobile plant of claim 7, wherein the controller operates autonomously.

10. The mobile plant of claim 1, wherein the arm assembly positions the tool with 6 degrees of freedom.

11. The mobile plant of claim 1, wherein the arm assembly comprises a boom arm assembly, wherein the boom arm assembly comprises a first boom arm portion and a second boom arm portion, wherein the first and second boom arm portions are interconnected by a slew assembly, wherein the tool is releasably engageable with the second boom arm portion, and wherein the first boom arm portion is extendable.

12. The mobile plant of claim 11, wherein the at least one primary sensor is mounted to the first boom arm portion, and the at least one secondary sensor is mounted to the slew assembly.

13. The mobile plant of claim 11, wherein the arm assembly comprises a cable which has one end adapted to be secured to an end of the tool, and the arm assembly comprises a winch upon which the cable is wound.

14. A method of assessing the grade/concentration of ore in a hole, the method comprising: positioning the plant of claim 1 relative to a hole; sensing the geographical location of the tool relative to the hole, and sensing the alignment of the tool with respect to the hole, and adjusting the position of the tool based on the sensed geographical location and the sensed alignment, to thereby align the tool with the hole; and lowering the tool into the hole.

15. The plant of claim 1 wherein the arm assembly comprises a boom arm assembly, the A boom arm assembly is adapted to support and guide a cable therealong, the boom arm assembly comprises a first boom arm portion and a second boom arm portion wherein the first boom arm portion and second boom arm portion are interconnected by a slew assembly, wherein the slew assembly enables movement of the first boom arm portion relative to the second boom arm portion about a plurality of axes.

16. The boom arm assembly of claim 15, wherein the tool is releasably engageable with the second boom arm portion, wherein the boom arm assembly comprises the at least one primary sensor for sensing the geographical location of the tool, and the at least one secondary sensor for sensing the alignment of the tool with respect to the hole.

17. A method of collecting data from an array of holes wherein the data is representative of the geological composition of the hole, the method comprising:
    executing a first operational sequence wherein a mobile plant according to claim 1 is positioned relative to the hole and placed into a ready position for receiving a tool of the mobile plant which is adapted to collect the data;
    executing a second operation sequence wherein the mobile plant is placed into a ready position for collecting the data;
    executing a third operation sequence wherein the mobile plant collects the data associated with the hole; and
    executing a fourth operation sequence wherein the mobile plant is moved to an adjacent hole.

18. A mobile plant for orientating a tool with respect to a hole, such as a blast hole, the plant comprising:
    an arm assembly for supporting and guiding a cable therealong wherein a tool can be releasably fixed to an end of the cable, the tool being adapted to be lowered into the hole, the arm assembly comprises a first boom arm portion, a second boom arm portion, and a slew assembly connecting the first boom arm portion and the second boom arm portion such that the cable passes through the slew assembly, the slew assembly enables movement of the first boom arm portion relative to the second boom arm portion about a plurality of axes, the slew assembly compensates for changes in the orientation of the boom arm to ensure the cable is supported along the length of the arm assembly, wherein the slew assembly rotates relative to the cable such that the cable is able to travel therethrough irrelevant of the orientation of the boom arm assembly, wherein the arm assembly positions the tool with six degrees of freedom;

a primary alignment means for positioning the plant relative to the hole;

a secondary alignment means for positioning the tool with respect to the hole, the secondary alignment means adjusts the arm assembly such that the tool supported by the arm assembly is caused to align with the hole opening, the secondary alignment means causes the tool to be placed vertical or at a desired angle to the vertical;

at least one primary sensor for sensing the geographical location of the tool; and at least one secondary sensor for sensing the location and/or orientation of the hole;

whereupon alignment with the hole the arm assembly lowers the tool into the hole.

* * * * *